(12) United States Patent
Lee et al.

(10) Patent No.: US 12,269,463 B2
(45) Date of Patent: Apr. 8, 2025

(54) ECO-FRIENDLY VEHICLE AND METHOD FOR CONTROLLING VALET MODE THEREFOR

(71) Applicants: Hyundai Motor Company, Seoul (KR); Kia Corporation, Seoul (KR)

(72) Inventors: Gyu Ri Lee, Namyangju-si (KR); Seong Wook Moon, Seoul (KR); Do Hwa Kim, Seoul (KR); Sung Bae Jeon, Ansan-si (KR); Sung Il Jung, Busan (KR); Jae Young Park, Seongnam-si (KR); Jeong Eun Kim, Seoul (KR); Hui Un Son, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 161 days.

(21) Appl. No.: 18/076,482

(22) Filed: Dec. 7, 2022

(65) Prior Publication Data
US 2023/0256958 A1     Aug. 17, 2023

(30) Foreign Application Priority Data

Feb. 17, 2022   (KR) .......................... 10-2022-0020761

(51) Int. Cl.
*B60W 30/06*       (2006.01)
*B60W 40/02*       (2006.01)
*B60W 50/14*       (2020.01)

(52) U.S. Cl.
CPC ............ *B60W 30/06* (2013.01); *B60W 40/02* (2013.01); *B60W 50/14* (2013.01); *B60W 2510/244* (2013.01)

(58) Field of Classification Search
None
See application file for complete search history.

(56) References Cited

U.S. PATENT DOCUMENTS

| | | | | |
|---|---|---|---|---|
| 7,812,712 | B2 * | 10/2010 | White | B60R 25/241 340/426.2 |
| 9,557,741 | B1 * | 1/2017 | Elie | G08G 1/147 |
| 9,809,218 | B2 * | 11/2017 | Elie | G06V 20/586 |
| 10,046,760 | B2 * | 8/2018 | Elie | G05D 1/0246 |

(Continued)

FOREIGN PATENT DOCUMENTS

| | | |
|---|---|---|
| JP | 2004-004111 A | 1/2004 |
| JP | 2009-121908 A | 6/2009 |

(Continued)

*Primary Examiner* — Kevin R Steckbauer
(74) *Attorney, Agent, or Firm* — Banner & Witcoff, Ltd.

(57) ABSTRACT

Disclosed are methods, apparatuses, and systems for controlling a valet mode of a vehicle. The method may include activating a valet mode, determining a parking environment of the vehicle being parked in a parking area, when the valet mode is set. Based on the parking environment of the vehicle, a first signal or a second signal may be output. The first signal may be configured to permit parking of the vehicle in the parking area. The second signal may be configured to prohibit parking of the vehicle in the parking area. Determining the parking environment of the vehicle may include determining, based on the parking environment, whether to limit a vehicle control of the vehicle and/or a degree of limit of the vehicle control.

16 Claims, 7 Drawing Sheets

(56) References Cited

U.S. PATENT DOCUMENTS

| | | | |
|---|---|---|---|
| 10,062,283 B2* | 8/2018 | Mielenz | G08G 1/146 |
| 10,789,847 B2* | 9/2020 | Maruiwa | G08G 1/149 |
| 11,100,433 B2* | 8/2021 | Voelz | B60L 58/10 |
| 11,285,996 B2* | 3/2022 | Matsunaga | B62D 15/028 |
| 11,407,405 B2* | 8/2022 | Kim | G08G 1/143 |
| 11,577,717 B2* | 2/2023 | Lim | G05D 1/0212 |
| 11,972,686 B2* | 4/2024 | Mukaiyama | B60W 30/06 |
| 11,972,687 B2* | 4/2024 | Mukaiyama | G08G 1/146 |
| 11,993,253 B2* | 5/2024 | Watanabe | G08G 1/143 |
| 12,027,049 B2* | 7/2024 | Momoshima | G08G 1/143 |
| 2016/0155331 A1* | 6/2016 | Mielenz | G08G 1/14 340/932.2 |
| 2017/0137024 A1* | 5/2017 | Elie | G05D 1/0246 |
| 2018/0012156 A1* | 1/2018 | Voelz | G05D 1/0285 |
| 2018/0056990 A1* | 3/2018 | Elie | G06F 16/5854 |
| 2018/0258663 A1* | 9/2018 | Maier | E04H 6/422 |
| 2019/0188817 A1* | 6/2019 | Yanagida | G06Q 10/06311 |
| 2020/0031395 A1* | 1/2020 | Matsunaga | B62D 15/0285 |
| 2020/0143683 A1* | 5/2020 | Maruiwa | G08G 1/149 |
| 2020/0148196 A1* | 5/2020 | Lim | G05D 1/0212 |
| 2020/0207337 A1* | 7/2020 | Kim | G08G 1/143 |
| 2020/0311641 A1* | 10/2020 | Noguchi | G06V 20/586 |
| 2020/0388155 A1* | 12/2020 | Mukaiyama | G08G 1/149 |
| 2022/0212657 A1* | 7/2022 | Sugano | G08G 1/146 |
| 2022/0388421 A1* | 12/2022 | Momoshima | B60L 58/10 |
| 2022/0388499 A1* | 12/2022 | Sugano | G06Q 30/0645 |
| 2023/0037218 A1* | 2/2023 | Momoshima | G08G 1/143 |
| 2023/0115782 A1* | 4/2023 | Mukaiyama | G06Q 50/40 701/25 |
| 2023/0119914 A1* | 4/2023 | Lee | B60W 10/06 701/22 |
| 2023/0202484 A1* | 6/2023 | Lee | B60W 50/04 701/1 |
| 2023/0211645 A1* | 7/2023 | Son | B60H 1/00357 701/36 |
| 2023/0211797 A1* | 7/2023 | Lee | B60W 50/0098 701/36 |
| 2023/0256958 A1* | 8/2023 | Lee | B60W 40/02 701/41 |
| 2023/0294722 A1* | 9/2023 | Lee | B60W 40/08 |
| 2024/0010097 A1* | 1/2024 | Nakagawa | H01M 10/44 |
| 2024/0054895 A1* | 2/2024 | Zhou | G08G 1/146 |
| 2024/0144825 A1* | 5/2024 | Chiba | G08G 1/146 |

FOREIGN PATENT DOCUMENTS

| | | |
|---|---|---|
| JP | 2014-169059 A | 9/2014 |
| JP | 2019-132682 A | 8/2019 |
| KR | 10-2016-0135264 A | 11/2016 |
| KR | 101967512 B1 | 4/2019 |

* cited by examiner

ECO-FRIENDLY VEHICLE AND METHOD FOR CONTROLLING VALET MODE THEREFOR

This application claims the benefit of Korean Patent Application No. 10-2022-0020761, filed on Feb. 17, 2022, which is hereby incorporated by reference in its entirety.

BACKGROUND

Field

The present disclosure relates to eco-friendly vehicles and a method for controlling a valet mode and determining a parking environment in consideration of characteristics of an eco-friendly vehicle, and controlling the functions of the vehicle according to the determined parking environment.

INTRODUCTION

A valet mode may indicate a driving mode that allows a vehicle's owner to restrict or limit certain functions of the vehicle when the owner of the vehicle allows other people to drive the vehicle temporarily, as during a valet parking service.

However, the conventional valet mode as described above is simply controlled in an on-off manner and thus detailed control of the valet mode depending on the situation is impossible, and characteristics of electric vehicles (EVs) or hybrid electric vehicles (HEVs), which have become more popular in recent years, are not considered in the valet mode.

For example, even when the valet mode is activated in a parking area, the vehicle owner may not realize that the vehicle has been valet-parked in an unsafe or unideal parking area, such as a steep slope, an unshaded area with direct sunlight, and/or an illegal parking area.

SUMMARY

Accordingly, the present disclosure is directed to eco-friendly vehicles (e.g., hybrid vehicles, electric vehicles, etc.) and a method for controlling a valet mode therefor that substantially obviates one or more problems due to limitations and disadvantages of the related art.

The present disclosure will discuss eco-friendly vehicles and provide one or more methods for controlling a valet mode therefor which may guide the eco-friendly vehicle to be valet-parked in a more stable parking area in consideration of characteristics of the eco-friendly vehicle and the surroundings of the parking area.

Additional advantages, objects, and features of the disclosure will be set forth in part in the description which follows and in part will become apparent to those having ordinary skill in the art upon examination of the following, or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, one or more methods for controlling a valet mode of a vehicle may include activating the valet mode of a vehicle, determining a parking environment of the vehicle being parked, in the valet mode, in a parking area, and based on the parking environment of the vehicle, outputting one of a first signal configured to permit parking of the vehicle in the parking area, or a second signal configured to prohibit parking of the vehicle in the parking area. Determining the parking environment of the vehicle may include, based on the parking environment, at least one of whether a vehicle control of the vehicle is limited, or a degree of limit of the vehicle control.

An apparatus for controlling a valet mode of a vehicle may include a parking setter configured to set the valet mode, a parking environment determiner configured to determine a parking environment of the vehicle being parked in a parking area, when the valet mode is set, and a controller configured to output a first signal configured to permit parking of the vehicle in the parking area or a second signal configured not to permit parking of the vehicle in the parking area depending on whether or not the parking environment of the vehicle is satisfied, wherein the parking environment determiner varies whether or not vehicle control is limited or a degree of limit of the vehicle control depending on the determined parking environment.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification, and it will be understood that the embodiments specified in the following description and the configuration shown in the drawings cover modifications, equivalents or alternatives which come within the scope and technical range of the present disclosure at the time of application thereof.

In the following description of the embodiments, terms, such as "first" and "second," are used only to describe various elements, and these elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present.

As used herein, singular forms may be intended to include plural forms as well, unless the context clearly indicates otherwise.

In the following description of the embodiments, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof. Further, the term "control unit" included in, for example, motor control unit (MCU), hybrid control unit (HCU), etc., may be widely used to refer to a controller configured to control a specific function of a vehicle, but may not mean a generic functional unit. For example, each control unit may include a communication device (e.g., a network adapter, etc.) configured to communicate with other controllers or sensors, a memory (e.g., random-access memory (RAM), read-only memory (ROM), an electrically erasable programmable read-only memory (EEPROM), flash memory, solid-state memory, a magnetic drive, an optical drive, etc.) configured to store operating system(s), logic commands (e.g., instructions), input and output information, etc., and at least one processor (e.g., central processing unit (CPU), a graphics processing unit (GPU), a field-programmable gate array (FPGA), an application-specific integrated circuit (ASIC), etc.) configured to perform determination, calculation, judgement, etc. necessary to control a function assigned to the controller so as to control the function.

Embodiments of the present disclosure suggest guiding an eco-friendly vehicle to be valet-parked in a parking area preferred by a vehicle owner by considering characteristics of the eco-friendly vehicle, and determining and classifying the parking area in the provision of the valet mode of the eco-friendly vehicle.

The "valet mode" described hereinafter may indicate a mode in which, assuming that the vehicle owner of an eco-friendly vehicle, a main driver, or a driver which has performed driving of the eco-friendly vehicle to a specific region in which driver changing is expected is replaced with another driver, at least some settings of the vehicle are changed or at least some functions and performances are limited. In addition, having a plurality of levels may mean that a specific level may have at least one of an upper level or a lower level based on the vertical relationship between the levels.

Further, types of execution, change and limitation of vehicle functions depending on a plurality of levels may include at least one of 1) a power threshold for a hybrid engine/motor to transition from its gasoline powertrain to a hybrid (e.g., electric) powertrain, 2) air-conditioning performance control, 3) speed limit, 4) acceleration limit, 5) parking impact reduction, 6) a driver evaluation function, 7) a parking spot feedback function, 8) a drive mode (an eco, normal or sports mode) limit function, or 9) a safety function. This will be set forth in following Table 1.

TABLE 1

| Target object | Control type | Control unit in charge |
|---|---|---|
| Engine/Motor | Raise a power threshold value required for starting an engine or motor (e.g., transitioning to a hybrid powertrain). Prevent engine or motor from being started by air-conditioning, catalyst-heating, and/or warm-up requests. | HCU |
| Air conditioning | Limit or prevent air-conditioning power (e.g., limited to 50% of available power). Prevent air conditioning while the vehicle is stationary. | HCU |
| Speed limit | Apply intelligent speed limit assist (ISLA) to manual speed limit assist (MSLA) or differentiate speed limits depending on road types and/or road conditions. | HCU |
| Acceleration limit | Reinforce APS scaling correction/demand torque filtering. Automatically activate an acceleration limiter. | HCU |
| Parking impact | Reduce impact at a parking block or curb by reducing a creep torque or an acceleration torque during parking. Perform activation in R (reverse) gear position or when a parking assist system (PAS) is operated. | HCU |
| Driving evaluation | Perform a vehicle driving evaluation function (e.g., implemented in a similar fashion to the ECO level). Calculate a score by quantifying sudden acceleration/sudden braking, a parking position, parking impact, etc. | AVN/HCU |
| Parking location | Park the vehicle somewhere else when it is parked in a no-parking area, an area having a steep slope, or an area having an excessive exposure to sunlight. Perform demand output and parking prohibition control. | CLU/HCU, SCU |
| Mode limit | Prohibit use of the sports mode. Forcibly execute the eco mode. | CLU |
| Safety function | Automatically activate an emergency braking apparatus, a blind spot detection (BSD) system, and/or a lane departure warning system. Increase the volume of alert sound. | CLU |

In Table 1, HCU indicates a hybrid control unit, an AVN indicates an audio/video/navigation system, a CLU indicates a cluster control unit, and an SCU indicates a shift-by-wire (SBW) control unit. The respective target objects to be controlled, the control types and the control units in charge, set forth in Table 1, are merely exemplary, and the present disclosure is not limited thereto.

First, the configuration of a control unit which controls a valet mode function will be described with reference to FIG. 1.

Figure 1:
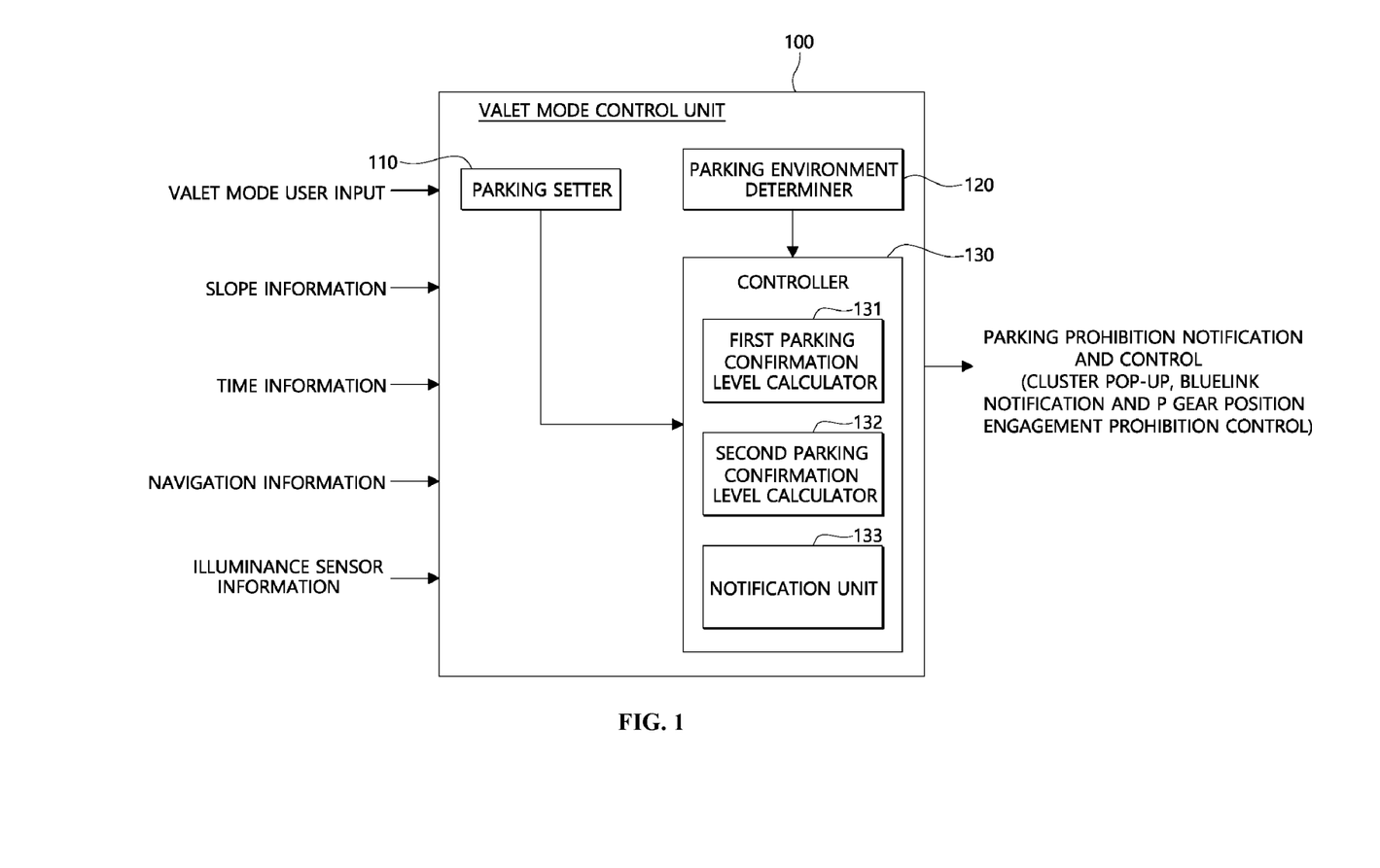
FIG. 1 is a block diagram showing an example of the configuration of a control unit which controls a valet mode.

FIG. 1 is a block diagram showing an example of the configuration of the control unit which controls the valet mode. One or more elements shown in FIG. 1 and other figures may be implemented as one or more computing devices and/or components. One or more elements shown in FIG. 1 and other figures may be implemented as hardware, software, or a combination of both. Modifications may be made to add, remove, combine, divide, etc. elements of a valet mode control unit 100. A computing device may include memory that stores computer-executable instructions that, when executed by one or more processors of the computing device, cause the computing device to perform one, some, or all of the operations described herein. Such memory and processor(s) may also or alternatively be implemented through one or more integrated circuits (ICs). An IC may be, for example, a microprocessor that accesses programming instructions or other data stored in a read-only memory (ROM) and/or hardwired into the IC. For example, an IC may comprise an application-specific integrated circuit (ASIC) having gates and/or other logic dedicated to the calculations and other operations described herein. An IC may perform some operations based on execution of programming instructions read from ROM or random-access memory (RAM), with other operations hardwired into gates or other logic. Further, an IC may be configured to output image data to a display buffer.

Referring to FIG. 1, a valet mode control unit 100 configured to control the valet mode of an eco-friendly vehicle may use an accelerator position sensor (APS) value, a brake position sensor (BPS) value, state of charge (SOC) information of a battery, navigation information, speed and acceleration information, driving distance information (e.g., detected by an odometer), commands input by a user, slope information, time information, illuminance information, etc., as input information. Further, control commands regarding parking prohibition notification and control functions, which are transmitted to other control units, may be used as output information. For example, the control commands may be cluster pop-up, application notification and P (parking) gear position engagement prohibition control commands. For example, an application notification may be referred to as a Bluelink notification or an application notification. Bluelink® is a telematics service provided by Hyundai Motor Company of Seoul, South Korea, but it may be any telematics service for the purpose of this disclosure.

The APS value and the BPS value may be acquired by sensors configured to sense amounts of operation of respective pedals, and may be replaced with demand powers or demand torques transmitted from an upper-level control unit for controlling the powertrain (e.g., the hybrid control unit).

The state of charge (SOC) may refer to the state of charge of the high-voltage battery configured to supply power to an electric motor (not shown), which outputs driving power. The SOC information may be acquired by a battery sensor or a battery control unit (e.g., a battery management system (BMS)).

The navigation information may be acquired by the audio/video/navigation (AVN) system, and may include information regarding a road type corresponding a road at the current position of the vehicle or a road located in front of the vehicle within a designated distance, limit speeds, whether or not there is a parking lot, etc. Such information is merely exemplary, and the present disclosure is not limited thereto.

The audio/video/navigation (AVN) system may be electrically connected to at least one camera disposed in the vehicle, may analyze an image received in real time from the at least one camera, may acquire or process various information based on values acquired by analysis, and/or may display the acquired or processed information.

The speed information may be acquired by a vehicle speed sensor, and the acceleration information may be acquired by an acceleration sensor. Such information is merely exemplary, and the present disclosure is not limited thereto. For example, the acceleration information may be acquired by differentiating (e.g., taking a mathematical derivative of) the speed information.

The driving distance information may be acquired by a cluster.

The illuminance information may be acquired by an illuminance sensor.

The slope information may be acquired by a gyro sensor

The time information may be acquired by the audio/video/navigation (AVN) system.

User inputs may be input through a command input unit provided in the vehicle, for example, a dial, a key button, a touch button, a touchscreen or the like, and may be transmitted via a telematics center by executing an application installed in a user portable terminal and/or a smart device.

Sources of the above-described respective input information are focused on initial sources of the corresponding information, and the input information may be information which is transmitted to the valet mode control unit 100 via other control units or be information which has undergo processing, such as filtering, by other control units depending on the configuration of the vehicle.

The valet mode control unit 100 may include a parking setter 110, a parking environment determiner 120, and a controller 130.

The valet mode control unit 100 applicable to the embodiments of the present disclosure may be accompanied by control of the powertrain depending on a parking environment, and may thus be implemented as an upper-level control unit having the integrated control function of the powertrain, such as the vehicle control unit (VCU) in case of an electric vehicle (EV) or the hybrid control unit (HCU) in case of a hybrid electric vehicle (HEV), without being limited thereto.

Hereinafter, the respective elements of the valet mode control unit 100 will be described in more detail.

First, the parking setter 110 may set (e.g., enter, initiate, activate, etc.) the valet mode. The parking setter 110 may determine activation of the valet mode, when the valet mode is selected by a driver or a user or valet mode conditions are satisfied. The parking setter 110 may set the valet mode under the control of the valet mode control unit 100, when at least one of valet mode conditions which are described below is satisfied, except for a case in which the vehicle is moved to be parked in a designated parking area. However, the present disclosure is not limited thereto.

A case in which the vehicle is maintained under a predetermined speed for a designated time (e.g., the speed of the vehicle is less than 10 kph (e.g., V<10 kph)

A case in which the parking assist system (PAS) (e.g., smart parking assist system (SPAS), a remote smart parking assist (RSPA) system, etc.) is operated A case in which the driver shifts the transmission of the vehicle into the P gear position A case in which it is sensed that the vehicle reaches a predetermined location predetermined by the navigation system (e.g., an airport, a hotel, a restaurant, a parking lot, a location determined as a valet parking available area by the navigation system, a location predetermined by the user, or the like)

A case in which a parking lot is recognized through recognition information captured by a camera mounted in the vehicle A case in which it is determined that the vehicle is in a parking lot mode through internal logic based on sensor information of the vehicle (e.g., including a case in which it is determined that the BPS value maintains a threshold value or more for a designated time during parking through analysis of operation of the APS and the BPS, a case in which the driver manipulates a parking brake, or the like, without being limited thereto)

A case in which the driver attempts to turn off the engine or motor of the vehicle (e.g., a case in which starting or turning-off of the engine or motor of the vehicle is sensed through a start sensor)

A case in which the door, the trunk or the hood of the vehicle is opened or closed (e.g., including a case in which opening or closing of a driver's seat door is sensed by a door sensor, a case in which opening or closing of the trunk or the hood is sensed by a trunk sensor or a hood sensor, or the like, without being limited thereto)

Thereafter, the parking environment determiner 120 may determine the parking environment of the vehicle which is being parked in the parking area, when the valet mode is set (e.g., determined) through the parking setter 110. The parking environment determiner 120 may vary whether or not vehicle control is limited or a degree of limit of the vehicle control depending on the determined parking environment. That is, the parking environment determiner 120 may classify the determined parking environment as at least one first parking confirmation level.

For example, the parking environment determiner 120 may set (e.g., determine) at least one first parking confirmation level based on at least one parking factor. The at least one parking factor may include a slope level of the parking area, a sunlight exposure level of the parking area, and/or a predetermined preference level of the parking area.

Conditions (e.g., environmental thresholds) to determine the at least one first parking confirmation level are as follows.

The slope level may be determined depending on the slope [%] (e.g., grade) of the parking area. For example, the slope of 3% or less may be set to level 1, the slope of 3% to 5% may be set to level 2, and the slope of 5% to 7% may be set to level 3. However, the present disclosure is not limited thereto, and the set ranges of the respective slopes may be changed by gathering the parking environment of the vehicle, the status of the vehicle, the weather in the parking area, etc.

The sunlight exposure level may be determined through position, latitude, altitude, time, season and weather information, an illuminance sensor, an outdoor temperature sensor, etc. For example, when the sunlight exposure level is determined, the sunlight exposure level may be set by varying a threshold value in the winter and the summer. When the sunlight exposure level is determined, the sunlight exposure level may be set by varying the threshold value in the daytime and at night. When the sunlight exposure level is determined, the sunlight exposure level may be set by varying the threshold value(s) depending on the latitude. However, the present disclosure is not limited thereto.

A non-preferred parking area predetermined by a vehicle owner is determined through navigation information and camera information. For example, non-preferred parking areas may include a school zone, an area near a fire hydrant, an area near a crosswalk or an intersection, a bus station, indoor and outdoor places, etc., without being limited thereto.

An illegal parking may be is determined through the navigation information and the camera information. For example, when a traffic sign is sensed from an image captured by a camera, the sensed traffic sign may be analyzed. When the sign "No parking" or "No-parking zone" is sensed in the analyzed traffic sign, this area may be determined as an illegal parking area, but the present disclosure is not limited thereto.

The controller 130 may output a first signal which permits parking of the vehicle in the parking area or a second signal which does not permit parking of the vehicle in the parking area depending on whether or not the parking environment of the vehicle is satisfied. The controller 130 may output the first signal when the parking environment of the vehicle is satisfied, and may output the second signal when the parking environment of the vehicle is not satisfied.

Here, the first signal may be a signal to inform of permission to park the vehicle or a signal to release parking prohibition control. The second signal may be a signal to inform of non-permission (e.g., denial) to park the vehicle, a signal to instruct the vehicle to be parked somewhere else, or a signal to execute parking prohibition control.

The controller 130 may include a first parking confirmation level calculator 131, a second parking confirmation level calculator 132, and a notification unit 133.

The first parking confirmation level calculator 131 may calculate the at least one parking factor, may set the first parking confirmation level based on a result value acquired by calculation.

The first parking confirmation level calculator 131 may sum up (e.g., weigh, combine) the at least one parking factor set by the parking environment determiner 120, and may set (e.g., determine) the first parking confirmation level based on a result value acquired by summing up the at least one parking factor, under the control of the controller 130. For example, the first parking confirmation level may be set to at least one level disposed at regular intervals. The first parking confirmation level calculator 131 may determine the first parking confirmation level based on the result value. Then, the controller 130 may vary whether or not vehicle control is limited or a degree of limit of the vehicle control depending on the first parking confirmation level determined by the first parking confirmation level calculator 131. For example, the controller 130 may increase a reference to determine whether or not the vehicle control is limited and the degree of limit of the vehicle control, as the first parking confirmation level decreases, and may decrease the reference to determine whether or not the vehicle control is limited and the degree of limit of the vehicle control, as the first parking confirmation level increases.

The above-described first parking confirmation level may be expressed as Equation 1 below.

$$Level_1 = Level_{slope} + Level_{sunlight} + Level_{site} \quad \text{[Equation 1]}$$

$Level_1$ may indicate the first parking confirmation level, $Level_{slope}$ may indicate the slope level, $Level_{sunlight}$ may indicate the sunlight exposure level, and $Level_{site}$ may indicate the preference level of the parking area.

Further, the first parking confirmation level calculator 131 may apply designated weights to the respective parking factors, when the at least one parking factor is added, and may set the first parking confirmation level based on a result value acquired by summing the at least one parking factor. Here, the weights may be referred to as points and, in this case, the first parking confirmation level may be expressed as Equation 2 below.

$$Level_1 = w_{slope} \times Level_{slope} + w_{sunlight} \times Level_{sunlight} + w_{site} \times Level_{site} \quad \text{[Equation 2]}$$

$Level_1$ may indicate the first parking confirmation level, $Level_{slope}$ may indicate the slope level, $w_{slope}$ may indicate a weight on the slope level, $Level_{sunlight}$ may indicate the sunlight exposure level, $w_{sunlight}$ may indicate a weight on the sunlight exposure level, $Level_{site}$ may indicate the preference level of the parking area, and $w_{site}$ may indicate a weight on the preference level of the parking area. That is, the first parking confirmation level calculator 131 may apply different weights to the respective parking factors when the parking factors are summed under the control of the controller 130. The weights may be set by the vehicle owner or the main driver, without being limited thereto. For example, the valet mode control unit 100 may collect data regarding a parking area when the valet mode is previously executed, and a parking area preferred by the vehicle owner or the main driver, and may set the weights based on the collected data.

The above-described weight may be 0. This means that the corresponding level is not considered. For example, when the weight $w_{slope}$ on the slope level is 0, it may be interpreted that parking is permitted regardless of the slope level.

Further, the controller 130 may output the first signal so as to permit the vehicle to be parked in the parking area, when the first parking confirmation level set through the first parking confirmation level calculator 131 is less than a predetermined threshold value. On the other hand, the controller 130 may output the second signal so as to instruct the vehicle to be parked somewhere else or to execute parking prohibition control, when the first parking confirmation level set through the first parking confirmation level calculator 131 is equal to or greater than the predetermined threshold value.

Further, the first parking confirmation level calculator 131 may set the first parking confirmation level to always be greater than the predetermined threshold value, and may thus prohibit parking of the vehicle in the corresponding area, when the parking environment determiner 120 determines that the parking area is an illegal parking area under the control of the controller 130. For example, a condition $Level_{site,illegal} > Level_{Threshold}$ may be set. Here, $Level_{site,illegal}$ may indicate the first parking confirmation level of an illegal parking area, and $Level_{Threshold}$ may indicate the predetermined threshold value.

The first parking confirmation level calculator 131 may prohibit parking of the vehicle in the corresponding area regardless of whether or not the first parking confirmation level is greater than the predetermined threshold value, when the parking environment determiner 120 determines that the parking area is an illegal parking area under the control of the controller 130. However, the present disclosure is not limited thereto, and the controller 130 may permit the vehicle to be parked regardless of the predetermined threshold value, in case that a separate parking permission condition is satisfied depending on a parking situation, such as the parking situation, even when the parking area is determined as an illegal parking area. For example, the first parking confirmation level calculator 131 may permit parking of the vehicle, when a condition $Level_1 < Level_{Threshold}$ & $Site_{illegal}$ is satisfied under the control of the controller 130. For example, an area marked with a solid yellow line on a road may indicate an illegal parking area in which flexible vehicle parking and stopping are permitted depending on time and the day of the week, although the area varies in different localities.

Further, the first parking confirmation level calculator 131 may analyze data sensed by various sensors or external data under the control of the controller 130, and may permit parking of the vehicle in the corresponding area regardless of the predetermined threshold value, upon determining that flexible vehicle parking and stopping are possible even when the parking area is an illegal parking area based on results of analysis.

Further, the first parking confirmation level calculator 131 may set minimum threshold values of the respective parking factors calculated by the parking environment determiner 120 under the control of the controller 130, and may permit parking of the vehicle, when at least one of the respective parking factors is less than the corresponding minimum threshold value. For example, the first parking confirmation level calculator 131 may permit parking of the vehicle, when at least one parking confirmation condition and a condition $Level_{slope} < Level_{slope.Th}$ are satisfied under the control of the controller 130. However, the present disclosure is not limited thereto.

The second parking confirmation level calculator 132 may, when the second signal is output and one of the at least one set parking confirmation condition is satisfied, permit parking of the vehicle by reflecting the satisfied parking confirmation condition. The second parking confirmation level calculator 132 may digitize the satisfied parking confirmation condition. The at least one parking confirmation condition may include a travel time taken to park the vehicle and a travel distance taken to park the vehicle after transfer of the second signal.

That is, the second parking confirmation level calculator 132 may, in case that a valet driver drives the vehicle for a predetermined travel time or to a predetermined travel distance taken to park the vehicle so as to search for another parking area, even when the parking area is an area non-preferred by the vehicle owner, permit parking of the vehicle by reflecting the travel time and the travel distance.

The controller 130 may set a second parking confirmation level by subtracting the parking confirmation conditions digitized through the second parking confirmation level calculator 132 from the first parking confirmation level. The second parking confirmation level may be expressed as Equation 3 below.

$$Level_2 = Level_1 - (k_d d + k_t T + w_{charge} \times Level_{charge}) \quad \text{[Equation 3]}$$

Here, $Level_2$ may indicate the second parking confirmation level, $k_d d$ may indicate a travel distance of the vehicle after a notification of parking somewhere else, $k_t T$ may indicate a travel time after the notification of parking somewhere else, and $Level_{charge}$ may indicate whether or not the vehicle is charged using an external power supply. The notification of parking somewhere else may be output of the second signal or transfer of the second signal.

The parking confirmation conditions may be expressed as $k_d d + k_t T$. That is, $k_d d + k_t T$ is data acquired by digitizing a degree of efforts of the valet driver.

The controller 130 may count the above-described time "T" through the second parking confirmation level calculator 132 by reflecting a specific speed condition. Here, the stop time of the vehicle may be excluded from the travel time.

Further, the controller 130 may reflect the second parking confirmation level set by the second parking confirmation level calculator 132 when the vehicle is charged using the external power supply. The controller 130 may divides the SOC of a battery into a plurality of stages depending on predetermined ranges of the SOC. For example, the SOC of the battery may be divided into the plurality of stages, such as Critical High, High, Normal, Low and Critical Low, depending on the ranges of the SOC.

The ranges of the SOC divided into the plurality of stages may be set by applying the status of the vehicle, climate conditions, etc. to the maximum value, the minimum value and the average value calculated in at least one external power charging test. For example, the reason why the low range of the SOC is selected is to limit some performances of the powertrain. Of course, these ranges of the SOC are merely exemplary, and the present disclosure is not limited thereto. For example, the second parking confirmation level calculator 132 may reduce the second parking confirmation level, when the SOC is high under the control of the controller 130.

Further, the second parking confirmation level calculator 132 may apply a predetermined weight to $Level_{charge}$ under the control of the controller 130. The predetermined weight may be set by the vehicle owner, or may be set based on the status of the vehicle or the climate conditions.

As described above, the second parking confirmation level calculator 132 may permit parking of the vehicle based on the second parking confirmation level, when the first parking confirmation level is not satisfactory but the at least one parking confirmation condition is satisfied under the control of the controller 130. Here, the notification unit 133 may inform the vehicle owner of a corresponding fact using a Bluelink notification or the AVN system when the valet mode is released under the control of the controller 130. For example, the notification unit 133 may inform the vehicle owner of the corresponding fact using a pop-up or a message in the AVN system, and a detailed description thereof will be given later.

Further, the second parking confirmation level calculator 132 may set an illegal parking area to have a very high second parking confirmation level under the control of the controller 130 so as to not permit parking of the vehicle within a time and a distance which are physically possible. For example, a condition $Level_{site,illegal} > Level_{Threshold}$ may be set. Here, $Level_{site,illegal}$ may indicate the second parking confirmation level of the illegal parking area, and $Level_{Thredshold}$ may indicate a predetermined threshold value.

Further, the second parking confirmation level calculator 132 may use a parking permission condition regardless of the threshold value even when the parking area is an illegal parking area under the control of the controller 130. For example, the second parking confirmation level calculator 132 may permit parking of the vehicle when a condition $Level_2 < Level_{Threshold}$ & $Site_{illegal}$ is satisfied under the control of the controller 130.

The above-described second parking confirmation level may use a threshold value differing from the threshold value in the first parking confirmation level. For example, an equation $Level_{1,Threshold} \neq Level_{2,Threshold}$ or $Level_{1,slope,Threshold} \neq Level_{2,slope,Threshold}$ may be expressed.

The notification unit 133 may inform the vehicle owner or the valet driver of various information using the AVN system under the control of the controller 130. For example, the notification unit 133 may inform the vehicle owner or the valet driver of various information using a pop-up or a message in the AVN system.

That is, the notification unit 133 may provide various information to the vehicle owner or the valet driver using various methods through the AVN system. Various information stated below may be provided through a pop-up or a message. However, the present disclosure is not limited thereto.

When the first parking confirmation level is not satisfactory (e.g., when one or more environmental thresholds are not satisfied), the notification unit 133 may provide a notification message of "Please park somewhere else." or the like to the valet driver through a pop-up under the control of the controller 130.

Upon determining that the parking area is an illegal parking area, the notification unit 133 may provide a notification message of "This area is not a parking area." or the like to the valet driver through a pop-up under the control of the controller 130.

When the first parking confirmation level is not satisfactory but the second parking confirmation level is satisfactory, the notification unit 133 may inform the vehicle owner of this fact through communication or may allow the vehicle owner to determine whether or not parking is approved under the control of the controller 130.

When threshold values for the respective parking factors determined by the parking environment determiner 120 and at least one of the parking factors does not satisfy the corresponding threshold value, the notification unit 133 may inform the vehicle owner of this fact or may allow the vehicle owner to determine whether or not parking is approved under the control of the controller 130. For example, when $Level_{slope} > Level_{slope,Threshold}$, the notification unit 133 may inform the vehicle owner of this fact of the parking area having a high slope, and may allow the vehicle owner to determine whether or not parking is approved so as to permit parking of the vehicle or to not permit parking of the vehicle.

When the vehicle exits the corresponding parking area after a "parking somewhere else" message has been notified, the notification unit 133 may inform the vehicle owner that the vehicle is in a parking-permitted area under the control of the controller 130.

When the first parking confirmation level or the second parking confirmation level is not satisfactory, the controller 130 may prohibit engagement in the P gear position of the transmission of the vehicle (e.g., specifications of a shift-by-wire (SBW) system). Further, the notification unit 133 may inform the valet driver of prohibition of engagement in the P gear position of the transmission under the control of the controller 130.

When the first parking confirmation level or the second parking confirmation level is not satisfactory, the controller 130 may prohibit engagement of the parking brake (e.g., specifications of a brake (B)). Further, the notification unit 133 may inform the valet driver of prohibition of engagement of the parking brake under the control of the controller 130.

When the first parking confirmation level or the second parking confirmation level is not satisfactory, the controller 130 may deactivate the PAS system. Further, the notification unit 133 may inform the valet driver of deactivation of the PAS system under the control of the controller 130.

When the first parking confirmation level or the second parking confirmation level is not satisfactory, the controller 130 may prohibit the engine or motor of the vehicle from being turned off. Further, the notification unit 133 may inform the valet driver of prohibition of turning-off of the engine or motor of the vehicle under the control of the controller 130.

When the first parking confirmation level or the second parking confirmation level is not satisfactory, the controller 130 may prohibit the side mirrors of the vehicle from being folded. Further, the notification unit 133 may inform the valet driver of prohibition of folding of the side mirrors under the control of the controller 130.

When the first parking confirmation level or the second parking confirmation level is not satisfactory, the controller 130 may prohibit the doors, the trunk and the hood of the vehicle from being opened and closed. Further, the notification unit 133 may inform the valet driver of prohibition of opening and closing of the doors, the trunk and the hood of the vehicle.

Figure 2:
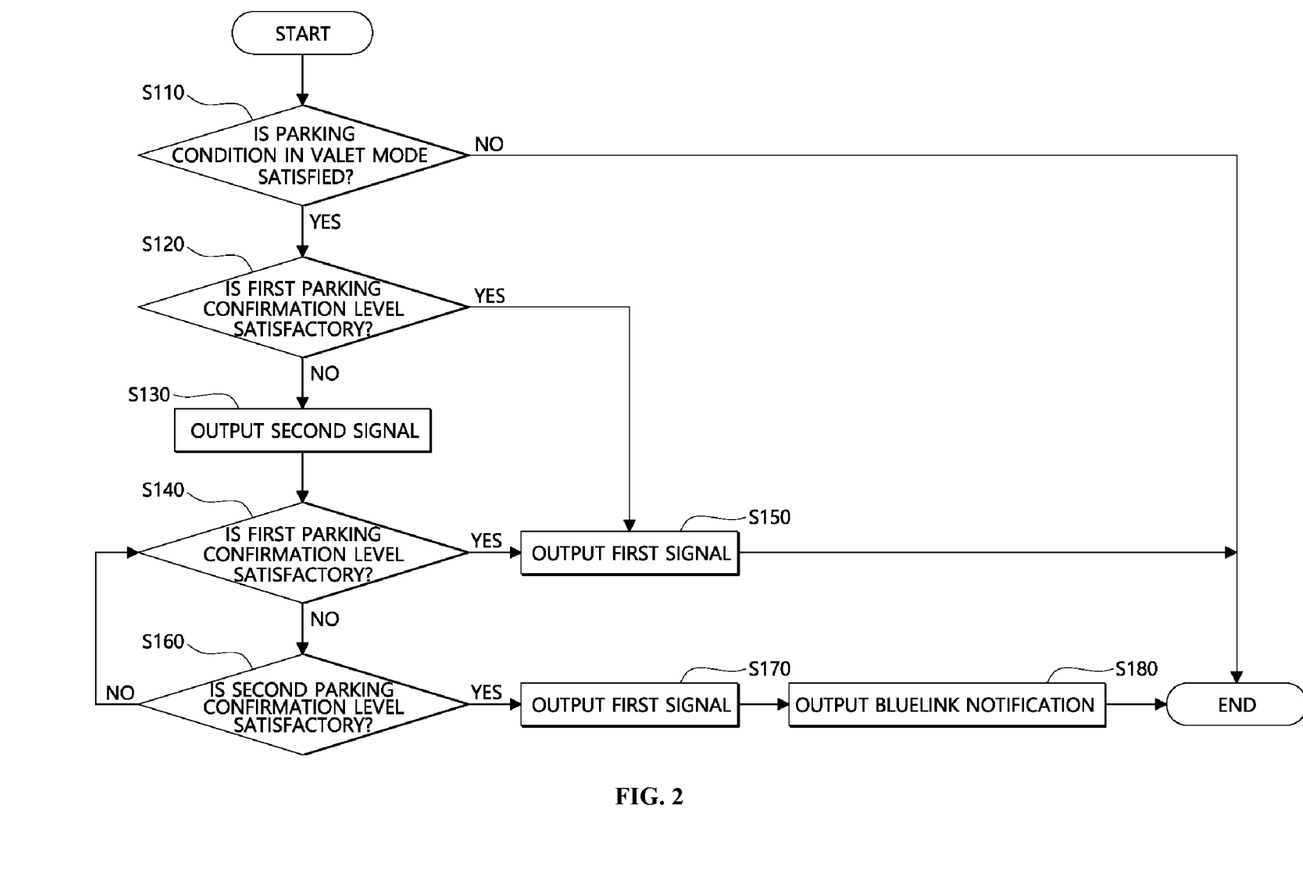
FIG. 2 is a flowchart representing an example of a process of controlling the valet mode.

FIG. 2 is a flowchart representing an example of a process of controlling the valet mode.

Referring to FIG. 2, the process of controlling the valet mode is as follows. The method or algorithm shown in FIG. 2 and other figures may be performed by one or more devices described herein. The method or algorithm shown in FIG. 2 and other figures may be embodied in computer-executable instructions that are stored in a non-transitory computer readable medium. The steps in this flow chart need not all be performed in the order specified and some steps may be omitted, added, or changed in order.

First, whether or not a parking condition in the valet mode is satisfied may be determined (S110). The parking setter 110 may determine activation of the valet mode, when the valet mode is selected by a driver or a user or at least one of valet mode conditions is satisfied.

When the valet mode is set, whether or not a first parking confirmation level is satisfactory may be determined based on the parking environment of a vehicle which is being parked in a parking area (S120). That is, the parking environment determiner 120 may set at least one first parking confirmation level based on at least one parking factor. The at least one parking factor may include a slope level of the parking area, a sunlight exposure level of the parking area, and a predetermined preference level of the parking area.

Further, whether or not vehicle control is limited or a degree of limit of the vehicle control may be varied depending on the first parking confirmation level determined based on the parking environment of the vehicle. A detailed description thereof has been given above with reference to FIG. 1, and will thus be omitted.

When the first parking confirmation level is satisfactory as a result of the determination (Yes in S120), the controller 130 may output a first signal which permits the vehicle to be parked in the parking area (S150). The first signal may be a signal to inform of permission to park the vehicle or a signal to release parking prohibition control.

When the first parking confirmation level is not satisfactory as the result of the determination (No in S120), the controller 130 may output a second signal which does not permit the vehicle to be parked in the parking area (S130). The second signal may be a signal to inform of non-permission (e.g., denial) to park the vehicle, a signal to instruct the vehicle to be parked somewhere else, or a signal to execute parking prohibition control.

After the second signal has been output (S130), when the vehicle exits the corresponding parking area and then the first parking confirmation level is satisfactory (Yes in S140), the controller 130 may output the first signal which permits the vehicle to be parked in a new parking area (S150).

On the other hand, after the second signal has been output (S130), when the vehicle exits the corresponding parking area but the first parking confirmation level is not satisfactory (No in S140), whether or not a second parking confirmation level is satisfactory may be determined based on at least one set parking confirmation condition (S160). The at least one parking confirmation condition may include a travel time taken to park the vehicle and a travel distance taken to park the vehicle after transfer of the second signal.

Thereafter, when the second parking confirmation level is satisfactory (Yes in S160), the controller 130 may output the first signal which permits the vehicle to be parked in the parking area (S170). After output of the first signal, the controller 130 may inform the vehicle owner of the corresponding fact through a Bluelink notification using the AVN system (S180).

When the second parking confirmation level is not satisfactory (No in S160) as the result of the determination, the controller 130 may continue to determine whether or not the first parking confirmation level is satisfactory (S140).

Figure 3A:
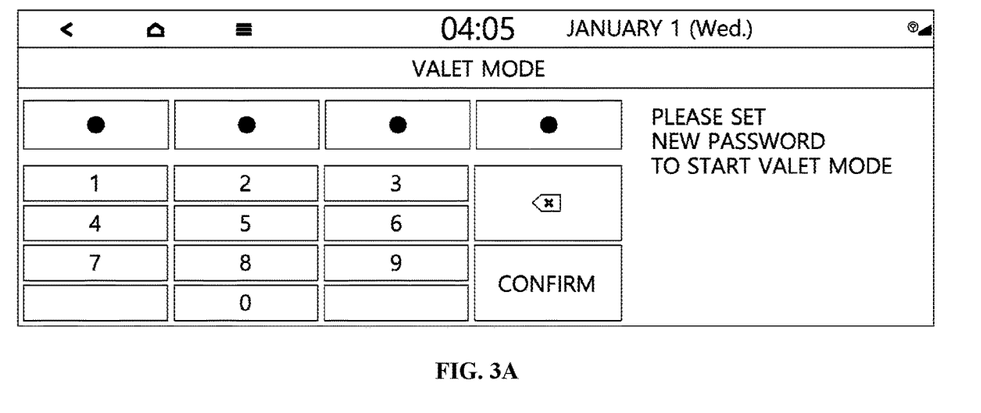
FIGS. 3A and 3B are diagrams showing an example of implementation of the valet mode.
Figure 3B:
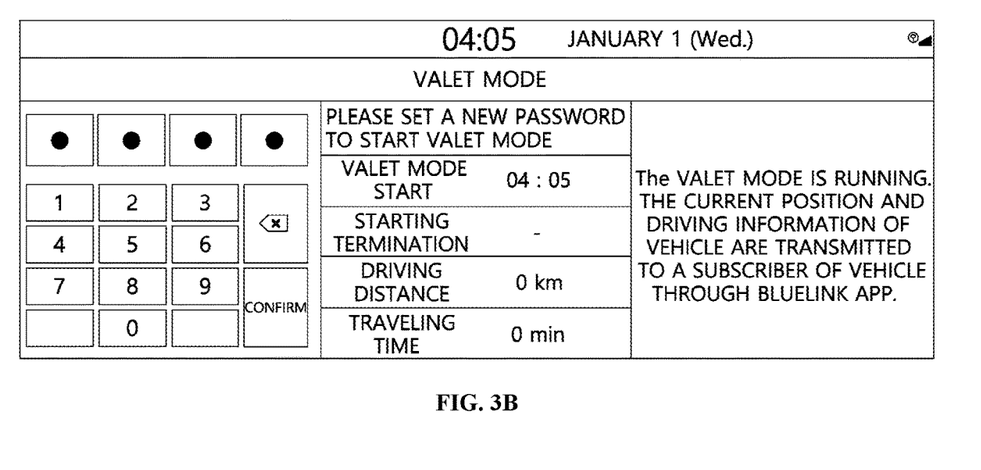

FIGS. 3A and 3B are diagrams showing an example of implementation of the valet mode.

Referring to FIGS. 3A and 3B, the valet mode may be a mode in which only necessary information and functions are selected so that a driver other than a vehicle owner or a valet driver may use and execute the information and the functions.

The vehicle owner may access a vehicle owner or user setting menu (USM) for the valet mode by inputting a designated command through the AVN system. For example, the vehicle owner may access a level setting menu for limiting air conditioning or a level setting menu for limiting a driving mode in the user setting menu (USM) for the valet mode.

In each menu, a description of functions which become current target objects to be set, first and second parking confirmation levels and limited functions related thereto, parking environment conditions or parking confirmation conditions, and functions of first and second signals may be displayed. However, the present disclosure is not limited thereto, and the functions of the first and second signals may pop up.

For example, the valet mode control unit 100 may display a screen so as to set a password, when the vehicle owner selects the valet mode in the user setting menu (USM). The valet mode control unit 100 may determine that valet mode entry conditions are satisfied, when the password is input by the vehicle owner.

When the vehicle enters the valet mode, a screen shown in FIG. 3(*b*) may be displayed, but the present disclosure is not limited thereto.

For example, the AVN system may display a valet mode start time, a parking completion time (an engine/motor-off time), driving distance and time, a maximum speed, limited functions depending on the first parking confirmation level and the second parking confirmation level, etc. under the control of the controller 130. Particularly, the AVN system may pop up the limited functions depending on the first parking confirmation level and the second parking confirmation level under the control of the valet mode control unit 100. The corresponding information may be confirmed through an application installed in the smart device of the vehicle owner under the control of the controller 130. For example, the application may be the Bluelink application, and various information related to parking, such as vehicle position information, the parking environment of the vehicle, a degree of progression of parking of the vehicle, etc., may also be displayed. A detailed description thereof will be given later.

Further, the valet mode control unit 100 may control operation of a rear camera of the vehicle, an emergency call (SOS), etc. in the valet mode.

The valet mode control unit 100 may release the valet mode, when the set password is input through the smart device or smart terminal of the vehicle owner in the valet mode. However, the valet mode control unit 100 is not limited thereto, and may release the valet mode when valet parking has been completed.

Further, the valet mode control unit 100 may exhibit a function of preventing additional input of the password so as to protect personal information, when a wrong password is input more than a designated number of times.

Figure 4:
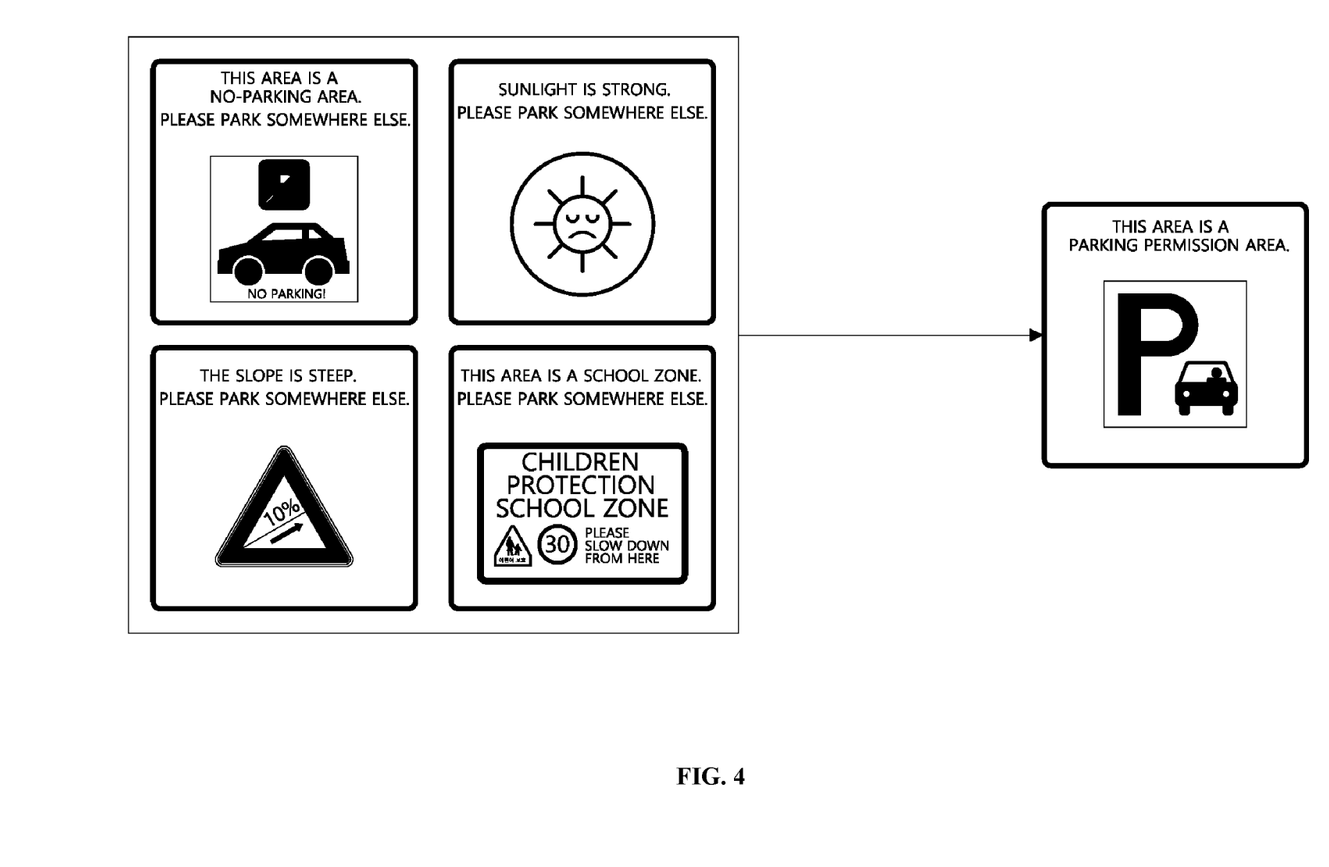
FIG. 4 is a diagram illustrating an example operation of a notification unit.

FIG. 4 is a diagram illustrating an example operation of the notification unit.

Referring to FIG. 4, the notification unit according to the present disclosure may notify or inform a valet driver of a first parking confirmation level, a second parking confirmation level, and limited functions depending on the first and second parking confirmation levels in the valet mode using the AVN system under the control of the controller.

The AVN system may output a first signal, i.e., a signal to inform of permission to park the vehicle or a signal to release parking prohibition control, or may output a second signal, i.e., a signal to inform of non-permission (e.g., denial) to park the vehicle, a signal to instruct the vehicle to be parked somewhere else, or a signal to execute parking prohibition control, depending on the first parking confirmation level or the second parking confirmation level.

As shown in FIG. 4, the AVN system may allow a message about parking somewhere else, such as "This area is a no-parking area. Please park somewhere else," "Sunlight is too strong. Please park somewhere else," "The slope is too steep. Please park somewhere else," or "This area is a school zone. Please park somewhere else," to pop up or to be displayed depending on the first parking confirmation level.

When the vehicle exits the corresponding area after the message about parking somewhere else has been displayed, the AVN system may allow a message about additional guidance, such as "This area is a parking-permitted area." to pop up or to be displayed depending on the first parking confirmation level or the second parking confirmation level.

Figure 5A:
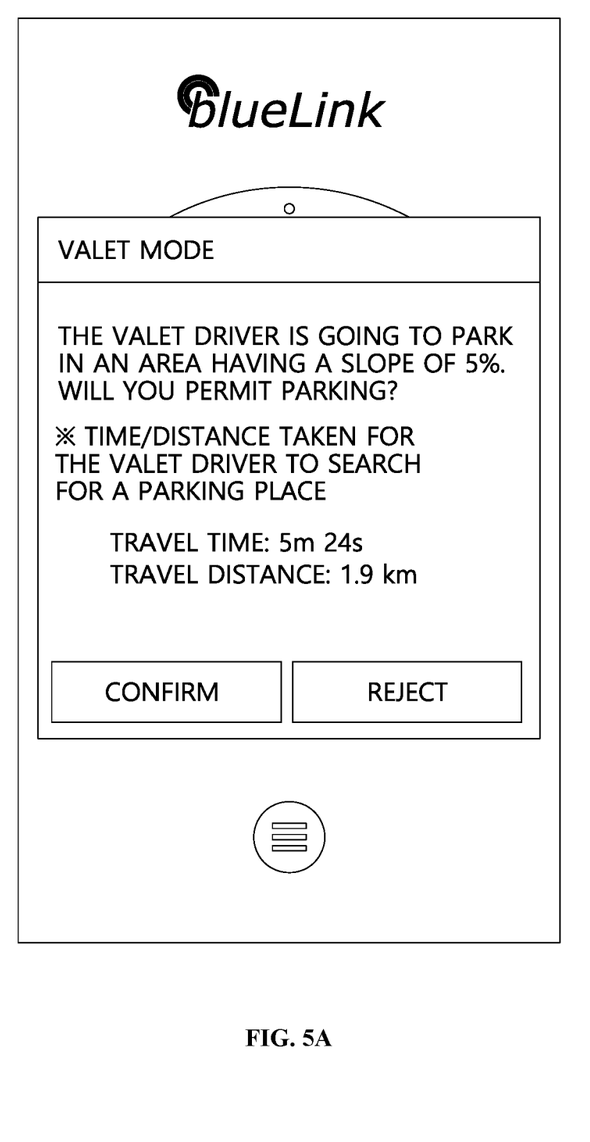
FIGS. 5A, 5B, and 5C are diagrams illustrating an example application executed on a smart device.
Figure 5B:
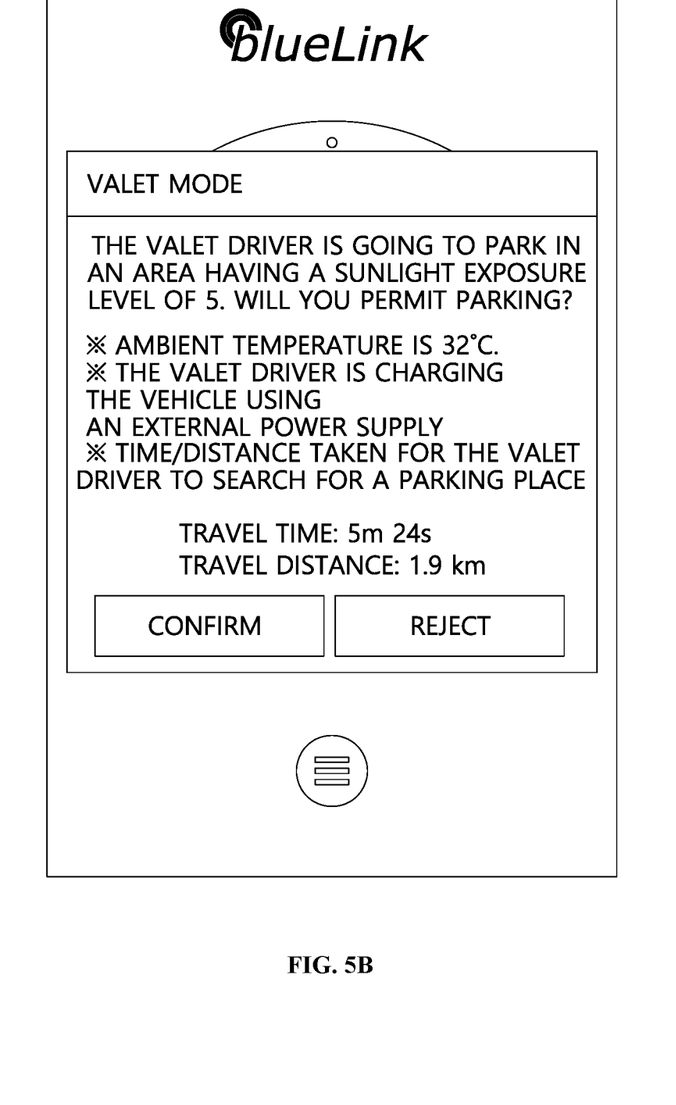
Figure 5C:
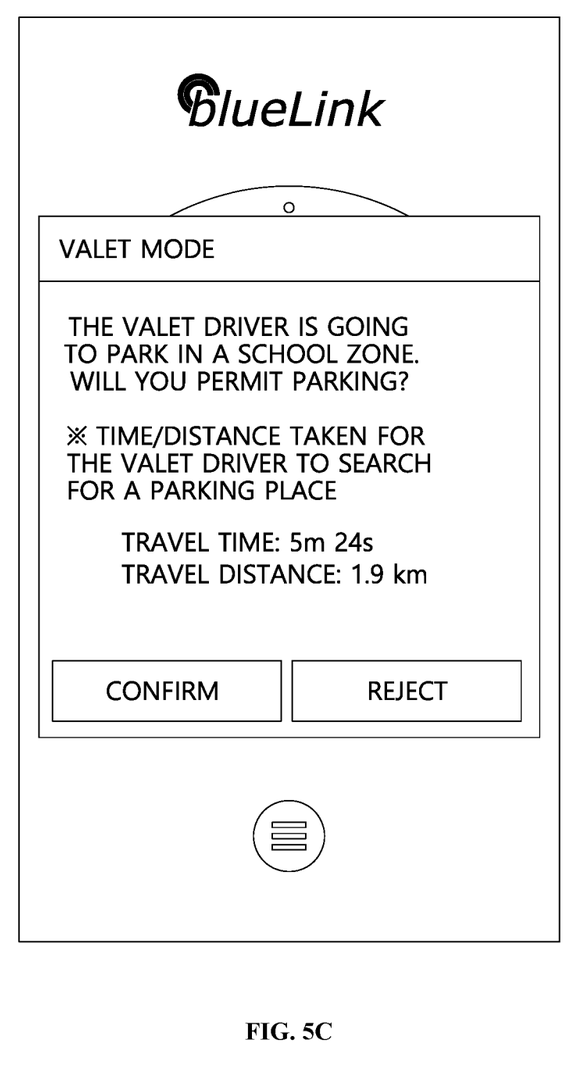

FIGS. 5A, 5B, and 5C are diagrams illustrating an example application executed on a smart device.

Referring to FIGS. 5A, 5B, and 5C, the notification unit according to the present disclosure may inform the vehicle owner of information about the status of the vehicle, which is being parked, and the environment around the parking area in the valet mode through a Bluelink notification using the AVN system under the control of the controller.

The notification unit according to the present disclosure may display various information related to parking, such as vehicle position information, the parking environment of the vehicle, a degree of progression of parking of the vehicle, etc., or may transfer the corresponding information to the Bluelink application installed in the smart device of the vehicle owner under the control of the controller.

The Bluelink application may display a Bluelink notification in real time.

For example, the Bluelink notification may display a message of "The valet driver is going to park in an area having a slope of 5%. Will you permit parking? ·X· Time/distance taken for the valet driver to search for a parking place, Travel time: 5 m 24 s, Travel distance: 1.9 km," as shown in FIG. 5A.

Otherwise, the Bluelink notification may display a message of "The valet driver is going to park in an area having a sunlight exposure level of 5. Will you permit parking? ·X· Ambient temperature is 32° C. ·X· The valet driver is charging the vehicle using an external power supply. ·X· Time/distance taken for the valet driver to search for a parking place, Travel time: 5 m 24 s, Travel distance: 1.9 km," as shown in FIG. 5B.

Otherwise, the Bluelink notification may display a message of "The valet driver is going to park in a school zone. Will you permit parking? ·X· Time/distance taken for the valet driver to search for a parking place, Travel time: 5 m 24 s, Travel distance: 1.9 km," as shown in FIG. 5C.

Then, the vehicle owner may permit parking of the vehicle by clicking the Approve button, or may not permit parking of the vehicle by clicking the Reject button.

That is, as described above, the control unit according to the present disclosure outputs a first signal (e.g., a signal to inform of permission to park the vehicle or a signal to release parking prohibition control) or may output a second signal (e.g., a signal to inform of non-permission (e.g., denial) to park the vehicle), a signal to instruct the vehicle to be parked somewhere else, and/or a signal to execute parking prohibition control, depending on the first parking confirmation level or the second parking confirmation level, and informs the valet driver or the vehicle owner of the corresponding fact using the AVN system or a Bluelink notification, thereby allowing the vehicle to be parked in a better parking environment.

The above-described level indexing method in which the first or second parking confirmation level is classified as any one of 1 to 4 in the embodiments of the present disclosure is merely an example, and means that a control method or kinds are varied as the level is varied, and thus, it will be apparent to those skilled in the art that other expressions, such as A, B, C and D, or 4, 3, 2 and 1, are possible while retaining the original meaning. The parking confirmation levels may be classified into fewer or more levels than 4 levels.

Further, in the above-described respective levels, two or more levels may be integrated into one level, or one level may be subdivided into lower levels depending on conditions. In addition, parameters for the vehicle status (e.g., a speed limit, an SOC, etc.) may be individually set to have respective levels.

The present disclosure described above may be implemented as computer-readable instructions (e.g., code) in a computer-readable storage medium in which programs are recorded. Such computer readable storage media may include all kinds of storage media in which data readable by computer systems is stored. For example, the computer readable storage media may include a hard disk drive (HDD), a solid-state drive (SSD), a silicon disk drive (SDD), a ROM, a RAM, a CD-ROM, a magnetic tape, a floppy disk, an optical data storage device, etc.

As is apparent from the above description, an eco-friendly vehicle and a method for controlling a valet mode therefor according to various embodiments of the present disclosure may guide valet parking of the vehicle in a preferred parking area based on characteristics of the eco-friendly vehicle and setting and classification of parking areas, thereby being capable of improving reliability in valet parking.

Further, the eco-friendly vehicle and the method for controlling the valet mode therefor according to various embodiments of the present disclosure may customize a preferred parking area based on characteristics of the eco-friendly vehicle and setting and classification of parking areas, thereby being capable of relieving anxiety about valet parking.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method comprising:
   activating, by one or more processors, a valet mode of a vehicle;
   determining a parking environment of the vehicle being parked, in the valet mode, in a parking area; and
   based on the parking environment of the vehicle, outputting one of:
     a first signal configured to permit parking of the vehicle in the parking area, or
     a second signal configured to prohibit parking of the vehicle in the parking area,
   wherein the determining the parking environment of the vehicle comprises determining, based on the parking environment, at least one of:
     whether to limit a vehicle control of the vehicle, or
     a degree of limit of the vehicle control,
   wherein the outputting one of the first signal or the second signal comprises:
     determining a combined value of at least two of a slope level of the parking area, a sunlight exposure level of the parking area, or a predetermined preference level of the parking area;
     determining a first parking confirmation level based on the combined value; and
     outputting the first signal based on the first parking confirmation level being less than a predetermined threshold value or the second signal based on the first parking confirmation level being greater than or equal to the predetermined threshold value.

2. The method according to claim 1, wherein the outputting one of the first signal or the second signal comprises outputting the second signal based on a determination that the parking environment of the vehicle fails to satisfy at least one environmental threshold.

3. The method according to claim 1, wherein the determining the parking environment of the vehicle comprises determining at least one level based on at least one of:
   the slope level of the parking area,
   the sunlight exposure level of the parking area, or
   the predetermined preference level of the parking area.

4. The method according to claim 1, wherein the determining the combined value comprises:
   applying different respective weights to the at least two of the slope level of the parking area, the sunlight exposure level of the parking area, or the predetermined preference level of the parking area.

5. The method according to claim 1, further comprising:
   determining a minimum threshold value for at least one of:
     the slope level of the parking area,
     the sunlight exposure level of the parking area, or
     the predetermined preference level of the parking area,
   wherein the second signal is output based on the minimum threshold value not being satisfied.

6. The method according to claim 1, further comprising:
   after the second signal is output, outputting the first signal based on a parking confirmation condition being satisfied.

7. The method according to claim 6, wherein the parking confirmation condition comprises at least one of:
   a predetermined travel time taken, after the second signal is output, to park the vehicle,
   a predetermined travel distance taken, after the second signal is output, to park the vehicle,
   whether or not a predetermined function is activated, or
   a predetermined state of charge (SOC) of a battery.

8. A non-transitory computer-readable storage medium storing instructions, when executed by one or more processors, cause an apparatus to:
   activate a valet mode of a vehicle;
   determine a parking environment of the vehicle being parked, in the valet mode, in a parking area; and
   based on the parking environment of the vehicle, output one of:
     a first signal configured to permit parking of the vehicle in the parking area, or
     a second signal configured to prohibit parking of the vehicle in the parking area,
   wherein the instructions, when executed by the one or more processors, cause the apparatus to determine the parking environment of the vehicle by determining, based on the parking environment, at least one of:
     whether to limit a vehicle control of the vehicle, or
     a degree of limit of the vehicle control, and
   wherein the instructions, when executed by the one or more processors, cause the apparatus to output one of the first signal or the second signal by:
     determining a combined value of at least two of a slope level of the parking area, a sunlight exposure level of the parking area, or a predetermined preference level of the parking area;
     determining a first parking confirmation level based on the combined value; and
     outputting the first signal based on the first parking confirmation level being less than a predetermined threshold value or the second signal based on the first parking confirmation level being greater than or equal to the predetermined threshold value.

9. The non-transitory computer-readable storage medium according to claim 8, wherein the instructions, when executed by the one or more processors, cause the apparatus to determine the parking environment of the vehicle by determining at least one level based on at least one of:
   the slope level of the parking area,
   the sunlight exposure level of the parking area, or
   the predetermined preference level of the parking area.

10. An apparatus associated with a vehicle, the apparatus comprising:
one or more processors; and
memory storing instructions that, when executed by the one or more processors, cause the apparatus to:
based on a parking environment of the vehicle, output one of:
a first signal configured to permit parking of the vehicle in a parking area, or
a second signal configured to prohibit parking of the vehicle in the parking area,
wherein the instructions, when executed by the one or more processors, cause the apparatus to determine the parking environment of the vehicle by determining, based on the parking environment, at least one of:
whether to limit a vehicle control of the vehicle, or
a degree of limit of the vehicle control, and
wherein the instructions, when executed by the one or more processors, cause the apparatus to output one of the first signal or the second signal by:
determining a combined value of at least two of a slope level of the parking area, a sunlight exposure level of the parking area, or a predetermined preference level of the parking area;
determining a first parking confirmation level based on the combined value; and
outputting the first signal based on the first parking confirmation level being less than a predetermined threshold value or the second signal based on the first parking confirmation level being greater than or equal to the predetermined threshold value.

11. The apparatus according to claim 10, wherein the instructions, when executed by the one or more processors, cause the apparatus to output one of the first signal or the second signal by outputting the second signal based on a determination that the parking environment of the vehicle fails to satisfy at least one environmental threshold.

12. The apparatus according to claim 10, wherein the instructions, when executed by the one or more processors, cause the apparatus to determine the parking environment of the vehicle by determining at least one level based on at least one of:
the slope level of the parking area,
the sunlight exposure level of the parking area, or
the predetermined preference level of the parking area.

13. The apparatus according to claim 10, wherein the instructions, when executed by the one or more processors, cause the apparatus determine the combined value by:
applying different respective weights to the at least two of the slope level of the parking area, the sunlight exposure level of the parking area, or the predetermined preference level of the parking area.

14. The apparatus according to claim 10, wherein the instructions, when executed by the one or more processors, further cause the apparatus to:
determine a minimum threshold value for at least one of:
the slope level of the parking area,
the sunlight exposure level of the parking area, or
the predetermined preference level of the parking area, and
wherein the instructions, when executed by the one or more processors, cause the apparatus to output the second signal based on the minimum threshold value not being satisfied.

15. The apparatus according to claim 10, wherein the instructions, when executed by the one or more processors, further cause the apparatus to
after the second signal is output, output the first signal based on a parking confirmation condition being satisfied.

16. The apparatus according to claim 15, wherein the parking confirmation condition comprises at least one of:
a predetermined travel time taken, after the second signal is output, to park the vehicle,
a predetermined travel distance taken, after the second signal is output to park the vehicle,
whether or not a predetermined function is activated, or
a predetermined state of charge (SOC) of a battery.

* * * * *